(12) United States Patent
Fatemi et al.

(10) Patent No.: US 11,916,436 B2
(45) Date of Patent: Feb. 27, 2024

(54) ELECTRIC MACHINE INCLUDING A STATOR HAVING A TOOTH PROFILE THAT REDUCES PARASITIC VOLTAGE

(71) Applicant: GM Global Technology Operations LLC, Detroit, MI (US)

(72) Inventors: Alireza Fatemi, Canton, MI (US); Mohammad F. Momen, Rochester Hills, MI (US); Thomas W. Nehl, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 95 days.

(21) Appl. No.: 17/375,101

(22) Filed: Jul. 14, 2021

(65) Prior Publication Data
US 2023/0018618 A1    Jan. 19, 2023

(51) Int. Cl.
*H02K 1/14* (2006.01)
*H02K 1/16* (2006.01)
*H02K 3/12* (2006.01)

(52) U.S. Cl.
CPC ............ *H02K 1/165* (2013.01); *H02K 1/146* (2013.01); *H02K 3/12* (2013.01); *H02K 2201/06* (2013.01)

(58) Field of Classification Search
CPC ................... H02K 1/165; H02K 2201/06
See application file for complete search history.

(56) References Cited

U.S. PATENT DOCUMENTS

| | | | |
|---|---|---|---|
| 10,666,099 B1 | 5/2020 | Fatemi et al. | |
| 10,923,969 B2 | 2/2021 | Fatemi et al. | |
| 2005/0285468 A1 | 12/2005 | Fukushima et al. | |
| 2012/0169158 A1 | 7/2012 | Buettner et al. | |
| 2013/0162063 A1 | 6/2013 | Sasajima | |
| 2014/0368082 A1 | 12/2014 | Barton | |
| 2015/0145366 A1 | 5/2015 | Akashi et al. | |
| 2015/0180307 A1 | 6/2015 | Lnuzuka | |
| 2017/0373550 A1* | 12/2017 | Soma | H02K 1/2766 |
| 2019/0173337 A1 | 6/2019 | Shimokawa et al. | |
| 2023/0017309 A1 | 1/2023 | Fatemi et al. | |
| 2023/0018286 A1 | 1/2023 | Fatemi et al. | |

* cited by examiner

Primary Examiner — Ramon M Barrera
(74) Attorney, Agent, or Firm — CANTOR COLBURN LLP (57) ABSTRACT

An electric machine includes a housing, a rotor rotatably mounted to the housing, and a stator mounted to the housing about the rotor. The stator includes a stator body formed from a plurality of laminations. The plurality of laminations include an outer annular surface defining a radius, an inner annular surface spaced from the rotor, and a plurality of radially inwardly extending stator teeth spaced one from another by plurality of gaps. Each of the plurality of gaps extend along the radius and include an opening exposed at the inner annular surface. The opening has a first side portion and a second side portion each extending at an angle relative to the radius.

19 Claims, 7 Drawing Sheets

ELECTRIC MACHINE INCLUDING A STATOR HAVING A TOOTH PROFILE THAT REDUCES PARASITIC VOLTAGE

INTRODUCTION

The subject disclosure relates to electric machines and, more particularly, to a stator for an electric machine including a tooth profile that reduces parasitic voltages.

An electric motor typically includes a shaft that supports a rotor. A voltage is applied to the electric machine causing the shaft to be driven resulting in a rotation of the rotor relative to a stator so as to produce electromotive force (EMF). In addition, to the EMF, the electric motor may also produce a back EMF or counter-EMF (CEMF) that opposes the applied voltage on the electric motor. When connected to a load, a voltage drop across the motor includes the EMF, the CEMF, a voltage drop across an applied load, and a parasitic voltage drop emanating from the shaft resulting from internal impedances of the rotor. The parasitic voltage passes from the shaft through the rotor into the stator.

Parasitic voltages lead to a reduction in energy generating efficiency of the electric motor. In current systems, which typically operate to produce 12 volts, the parasitic voltage is of minimal concern. However, as operating voltages increase with new faster switching devices, the parasitic voltage may have a more significant negative impact. Accordingly, it is desirable to provide an electric machine that is designed to reduce parasitic voltage effects.

SUMMARY

Disclosed is an electric machine including a housing, a rotor rotatably mounted to the housing, and a stator mounted to the housing about the rotor. The stator includes a stator body formed from a plurality of laminations. The plurality of laminations include an outer annular surface defining a radius, an inner annular surface spaced from the rotor, and a plurality of radially inwardly extending stator teeth spaced one from another by plurality of gaps. Each of the plurality of gaps extend along the radius and include an opening exposed at the inner annular surface. The opening has a first side portion and a second side portion each extending at an angle relative to the radius.

In addition to one or more of the features described herein each of the plurality of radially inwardly extending stator teeth includes a first end extending from the stator body and a tip portion that defines a portion of the inner annular surface.

In addition to one or more of the features described herein the tip portion of each of the plurality of radially inwardly extending stator teeth includes a first end portion defining the first side portion and a second end portion defining a second side portion of an adjacent opening.

In addition to one or more of the features described herein the first side portion includes a first angle and the second side portion of an adjacent one of the plurality of radially inwardly extending stator teeth includes a second angle that define the opening, the first angle and the second angle being one of an acute angle and an obtuse angle.

In addition to one or more of the features described herein the plurality of laminations includes a first plurality of laminations and a second plurality of laminations, wherein the first plurality of laminations includes a first side portion having a first angle and a second side portion having a second angle, and wherein the second plurality of laminations includes a first side portion having a third angle, and a second side portion having a fourth angle.

In addition to one or more of the features described herein the second plurality of laminations are positioned atop the second plurality of laminations.

In addition to one or more of the features described herein the first angle and the second angle combine to define a surface having a first end element, a second end element, and a recess disposed between the first end element and the second end element.

In addition to one or more of the features described herein the plurality of radially inwardly extending stator teeth include a first plurality of radially inwardly extending stator teeth spaced one from another by a first plurality of gaps, each of the first plurality of gaps including a first opening extending at a first angle and a second plurality of radially inwardly extending stator teeth spaced one from another by a second plurality of gaps including a second opening extending at a second angle that is distinct from the first angle.

In addition to one or more of the features described herein the plurality of radially inwardly extending stator teeth include a third plurality of radially inwardly extending stator teeth spaced one from another by a third plurality of gaps, each of the third plurality of gaps being devoid of an interruption in the inner annular surface.

In addition to one or more of the features described herein the each of the third plurality of radially inwardly extending stator teeth include a tip portion including a first bridge section and a second bridge section, the first bridge section and the second bridge section extending to an adjacent one of the plurality of radially inwardly extending stator teeth across the third plurality of gaps.

Also disclosed is a stator for an electric machine including a stator body formed from a plurality of laminations. The plurality of laminations include an outer annular surface defining a radius, an inner annular surface. A plurality of radially inwardly extending stator teeth is spaced one from another by plurality of gaps. Each of the plurality of gaps extend along the radius and include an opening exposed at the inner annular surface. The opening includes a first side portion and a second side portion each extending at an angle relative to the radius.

In addition to one or more of the features described herein each of the plurality of radially inwardly extending stator teeth includes a first end extending from the stator body and a tip portion that defines a portion of the inner annular surface.

In addition to one or more of the features described herein the tip portion of each of the plurality of radially inwardly extending stator teeth includes a first end portion defining the first side portion and a second end portion defining a second side portion of an adjacent opening.

In addition to one or more of the features described herein the first side portion includes a first angle and the second side portion includes a second angle, the first angle and the second angle being supplementary angles.

In addition to one or more of the features described herein the plurality of laminations includes a first plurality of laminations and a second plurality of laminations, wherein the first plurality of laminations includes a first side portion having a first angle and a second side portion having a second angle, and wherein the second plurality of laminations includes a first side portion having a third angle, and a second side portion having a fourth angle.

In addition to one or more of the features described herein the second plurality of laminations are positioned atop the second plurality of laminations.

In addition to one or more of the features described herein the first angle and the second angle combine to define a surface having a first end element, a second end element, and a recess disposed between the first end element and the second end element.

In addition to one or more of the features described herein the plurality of radially inwardly extending stator teeth include a first plurality of radially inwardly extending stator teeth spaced one from another by a first plurality of gaps, each of the first plurality of gaps including a first opening extending at a first angle and a second plurality of radially inwardly extending stator teeth spaced one from another by a second plurality of gaps including a second opening extending at a second angle that is distinct from the first angle.

In addition to one or more of the features described herein the plurality of radially inwardly extending stator teeth include a third plurality of radially inwardly extending stator teeth spaced one from another by a third plurality of gaps, each of the third plurality of gaps being devoid of an interruption in the inner annular surface.

In addition to one or more of the features described herein each of the third plurality of radially inwardly extending stator teeth include a tip portion including a first bridge section and a second bridge section, the first bridge section and the second bridge section extending to an adjacent one of the plurality of radially inwardly extending stator teeth across the third plurality of gaps.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
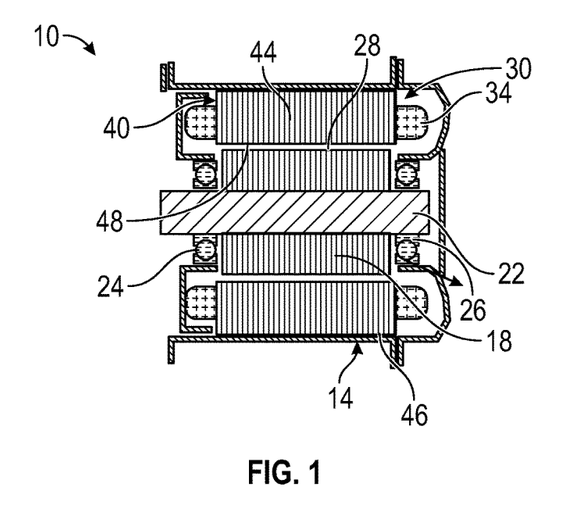
FIG. 1 is a schematic view of an electric machine including a rotor and a stator having a tooth profile that reduces parasitic voltages, in accordance with a non-limiting example.
Figure 2:
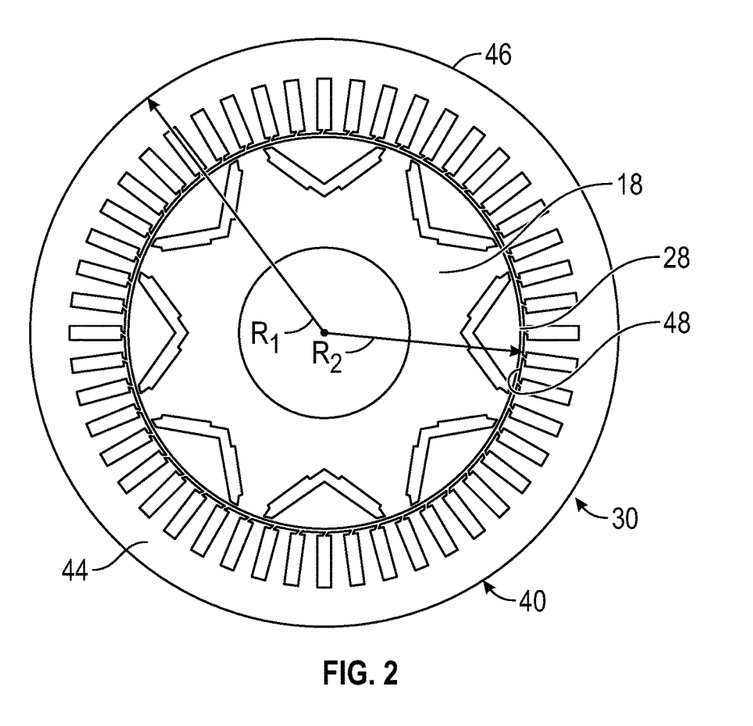
FIG. 2 is an axial end view of the rotor and stator of FIG. 1, in accordance with a non-limiting example.
Figure 3:
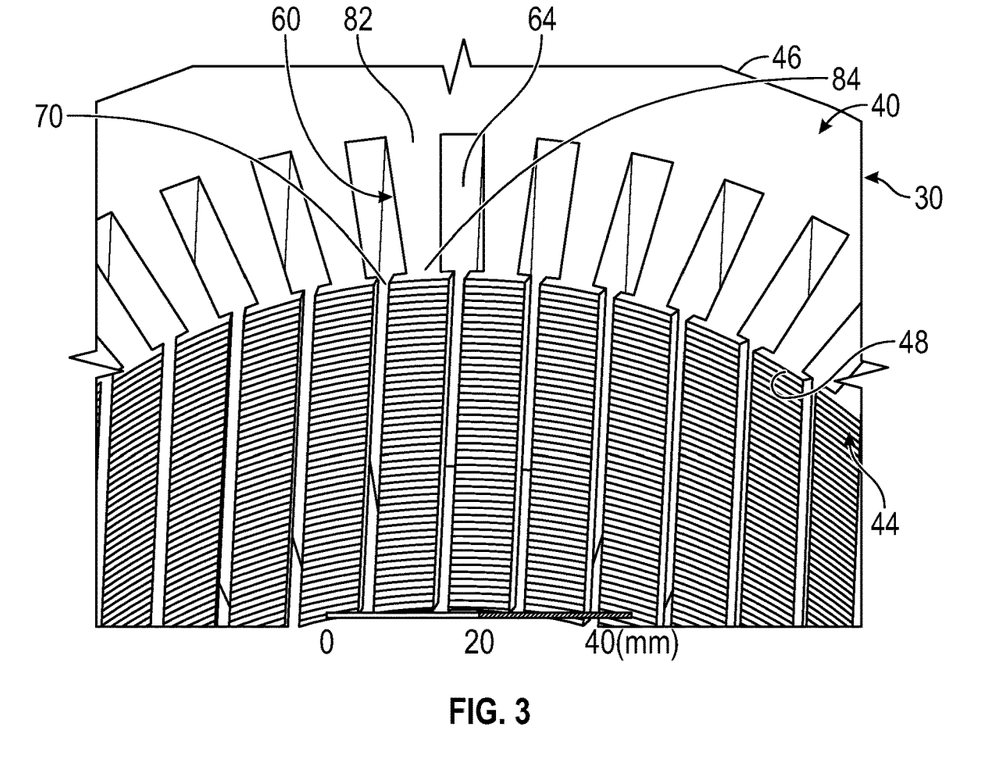
FIG. 3 is a partial perspective view of the stator of FIG. 2, in accordance with a non-limiting example.

An electric machine, in accordance with a non-limiting example, is indicated generally at 10 in FIGS. 1-3. Electric machine 10 includes a housing 14 that supports a rotor 18 mounted to a shaft 22. Shaft 22 is rotatably supported in housing 14 through a first bearing 24 and a second bearing 26. Rotor 18 includes an outer annular surface 28 and is disposed radially inwardly of a stator 30 that supports a stator winding 34. Stator 30 includes a stator body 40 formed from a plurality of stacked laminations 44 defining an outer annular surface 46 having a radius R1 and an inner annular surface 48 having a radius R2.

Figure 4:
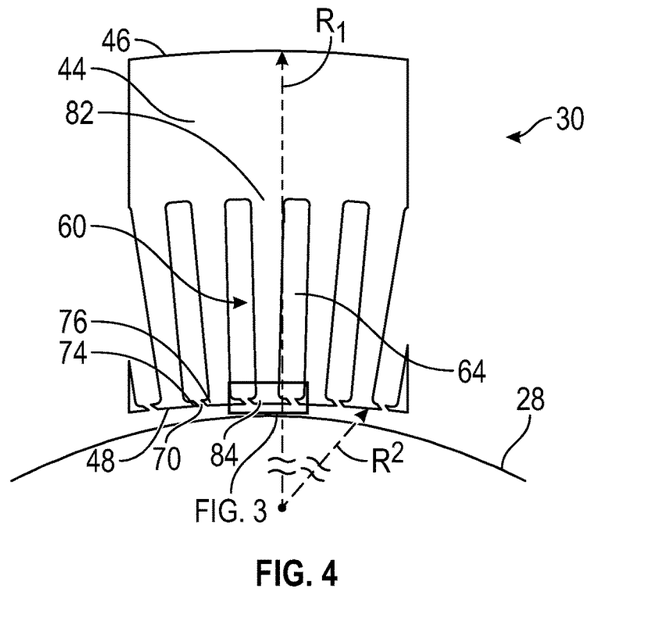
FIG. 4 is a partial plan view of a plurality of stator teeth of the stator of FIG. 1, in accordance with a non-limiting example.

Referring to FIG. 4 and with continued reference to FIGS. 1 and 2, stator 30 includes a plurality radially inwardly extending stator teeth, one of which is indicated at 60. Radially inwardly extending stator teeth 60 are spaced, one from another, by gaps such as indicated at 64. Select ones of the gaps 64 include an opening 70 defined by a localized discontinuity in inner annular surface 48. Each opening 70 is defined by a first side portion 74 extending from one of the radially inwardly extending stator teeth 60 and a second side portion 76 extending from another of the radially inwardly extending stator teeth 60. In a non-limiting example, first side portion 74 extends at a first angle relative to radius R1 and second side portion 76 extends at a second angle relative to radius R1. In a non-limiting example, the first and second angles are substantially similar. First and second angles may take the form of acute angles or obtuse angles.

Figure 5:
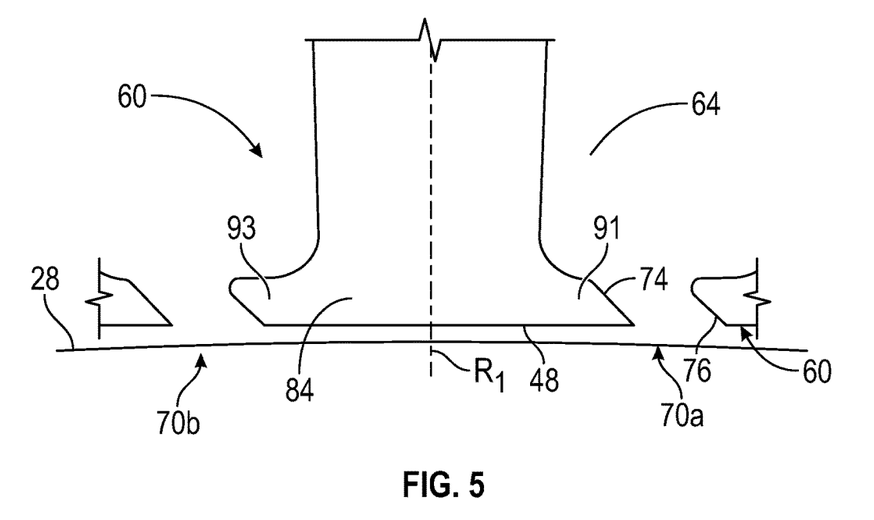
FIG. 5 is a plan view of a tip portion of one of the stator teeth of FIG. 4, in accordance with a non-limiting example.

Referring to FIG. 5 and with continued reference to FIG. 4, each of the plurality of radially inwardly extending stator teeth 60 includes a first end 82 positioned adjacent outer annular surface 46 and a tip portion 84 that defines a portion of inner annular surface 48. Tip portion 84 includes a first end portion 91 that defines first side portion 74 of a first opening 70a and a second end portion 93 that defines the second side portion 76 of a second, adjacent opening, 70b. With this arrangement, each opening 70 extends at an angle relative to radius R1 so as to electrically shield, at least partially, rotor 18 from the stator winding 34 to reduce magnetic flux transfer and lower parasitic voltages.

Figure 6:
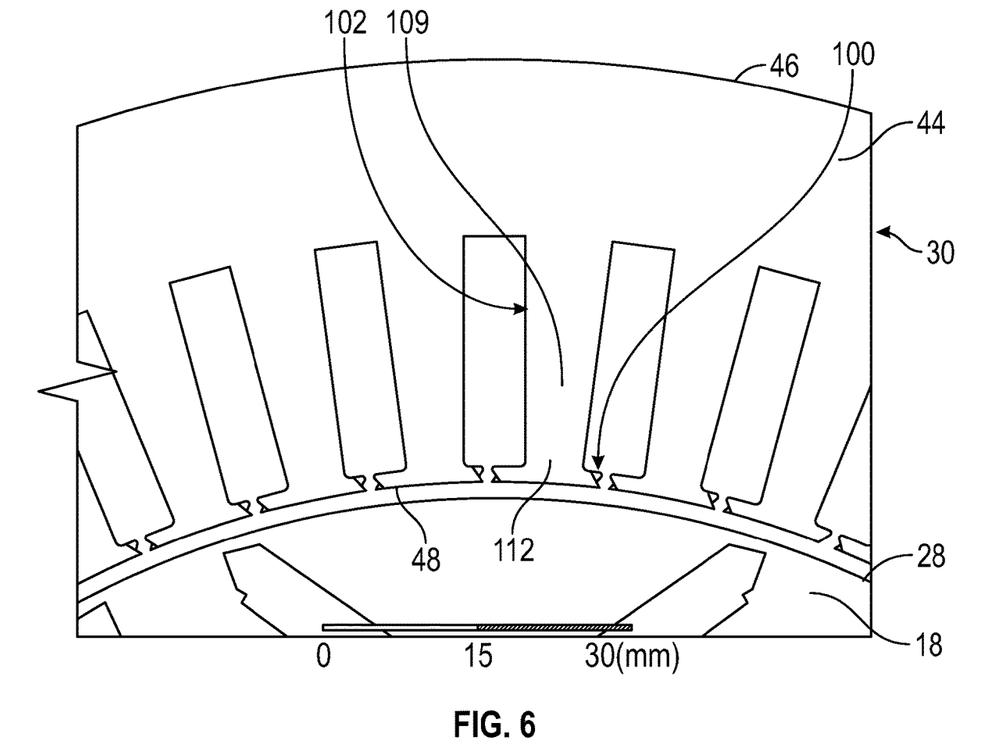
FIG. 6 is a partial axial end view of the rotor and stator, in accordance with another non-limiting example.
Figure 7:
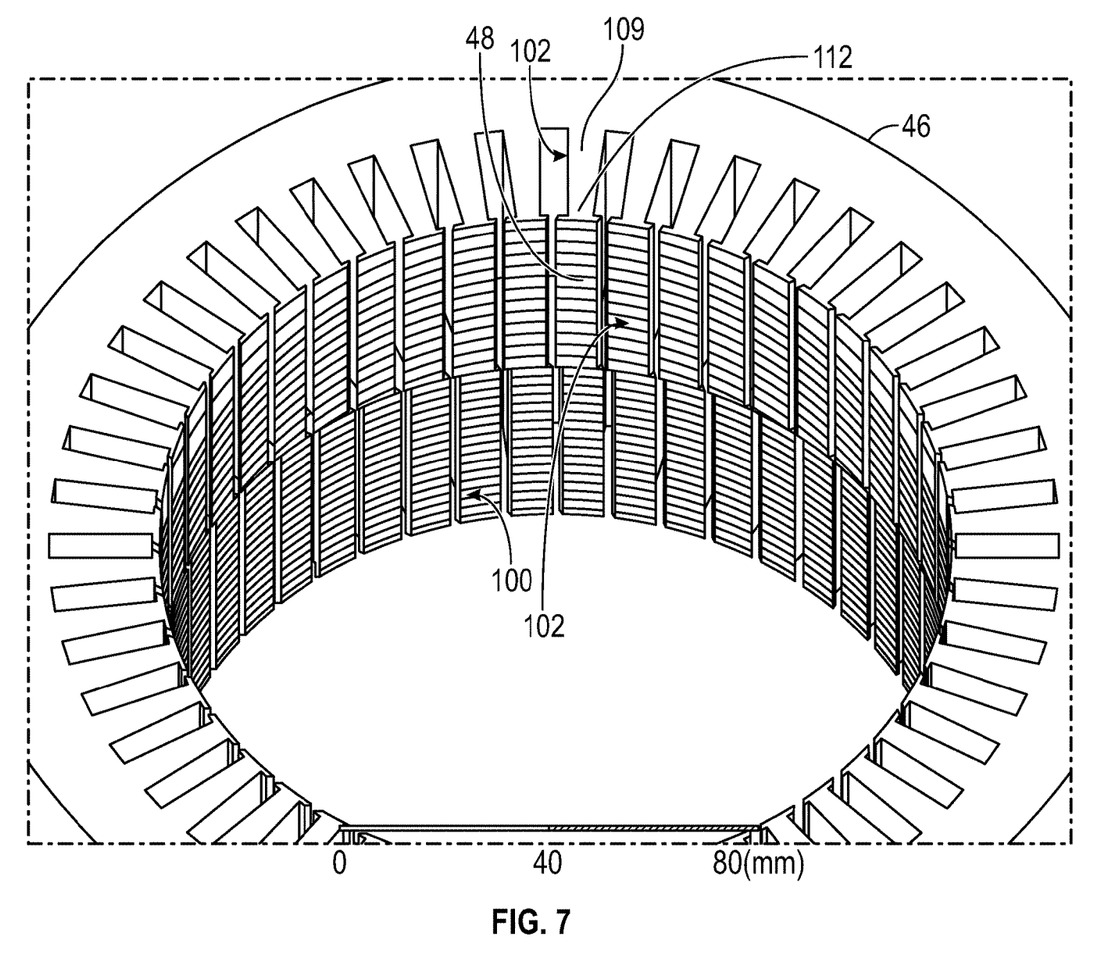
FIG. 7 is a partial perspective view of the stator of FIG. 6, in accordance with a non-limiting example.

Reference will now follow to FIGS. 6-7, and with continued reference to FIG. 1, in describing stator body 40 formed in accordance with another non-limiting example. In an embodiment, stator body 40 may be formed from a first plurality of laminations 100 and a second plurality of laminations 102. In a non-limiting example, first and second pluralities of laminations may be identically formed but integrated into stator body 80 in different orientations. For example, one or more of the second plurality of laminations 102 may be flipped or reversed and placed atop one or more of the first plurality of laminations 100, to reduce magnetic impact. In the non-limiting example shown, a stack (not separately labeled) of the second plurality of laminations 102 is positioned on and aligned with, a stack of the first plurality of laminations 100.

Figure 8A:
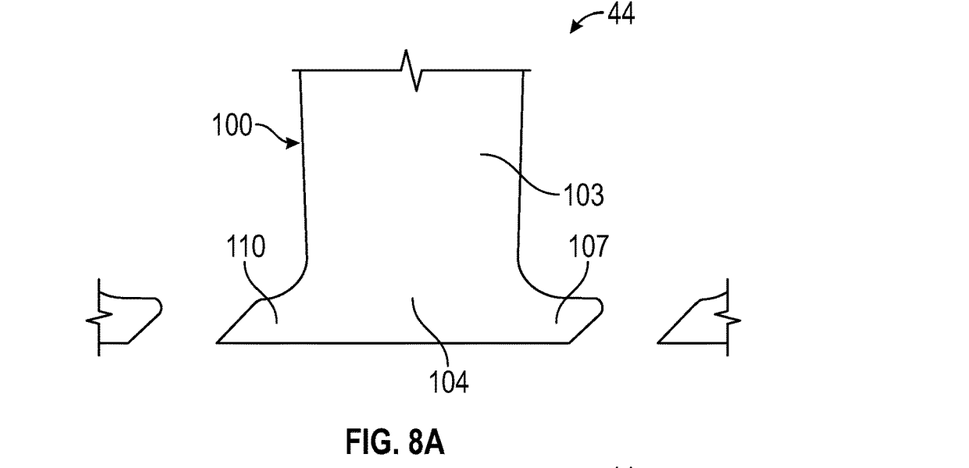
FIG. 8A is a is a partial plan view of a stator lamination including plurality of stator teeth in a first configuration, in accordance with a non-limiting example.
Figure 8B:
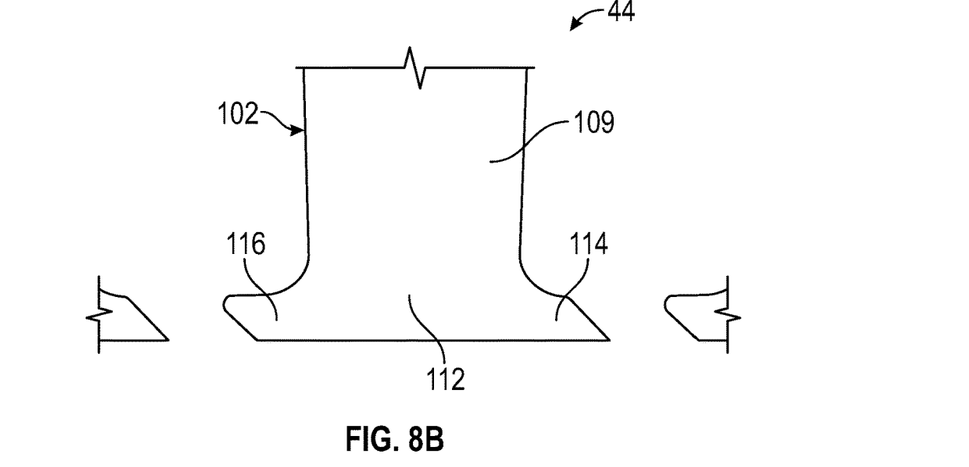
FIG. 8B is a partial plan view of a stator lamination including a plurality of stator teeth in a second configuration, in accordance with a non-limiting example.

In a non-limiting example shown in FIG. 8A, each of the first plurality of laminations 100 includes a plurality of radially inwardly extending stator teeth 103 having a tip portion 104. Tip portion 104 includes a first side portion 107 and a second side portion 110. Each of the first side portion 107 and the second side portion 110 include a corresponding surface (not separately labeled) having a first angle. FIG. 8b depicts one of the second plurality of laminations 102 including a plurality of radially inwardly extending stator teeth 109. The second plurality of laminations 102 depicted in FIG. 8B represent a mirror image of the first plurality of laminations 100. That is, in a non-limiting example, one or more of the first plurality of laminations 100 may be flipped over to become one or more second plurality of laminations 102.

Figure 8C:
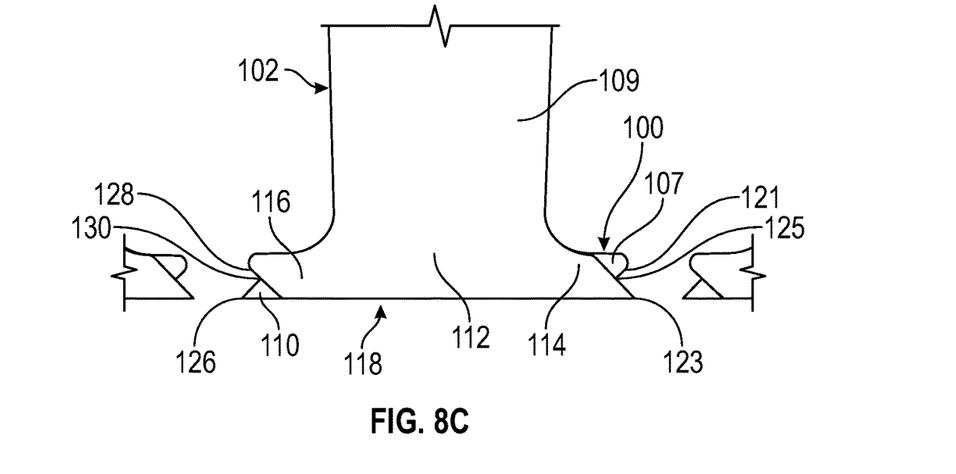
FIG. 8C is a partial plan view of the stator lamination of FIG. 4B stacked on top of the stator lamination of FIG. 4A, in accordance with a non-limiting example.

In a non-limiting example, the plurality of radially inwardly extending stator teeth 109 of the second plurality of laminations 102 includes a tip portion 112 having a first side portion 114 and a second side portion 116. Each of the first side portion 114 and the second side portion 116 include a corresponding surface (not separately labeled) having a second angle. In a non-limiting example, one or more of the second plurality of laminations 102 are overlaid onto one or more of the first plurality of laminations 100 as shown in FIG. 8C forming a composite tip portion 118, in order to reduce magnetic impact Composite tip portion 118 includes a first end element 121 and a second end element 123 separated by a recess 125. Similarly, composite tip portion 118 includes an opposing third end element 126 and a fourth end element 128 separated by a recess 130. Thus, in the non-limiting example the composite tip portion 118 creates differently oriented openings that create barriers to magnetic flux that reduces stray capacitance, disrupts a flow path between stator 30 and rotor 18 and lowers parasitic voltages that may detract from overall efficiency of the electric machine 10.

Figure 9A:
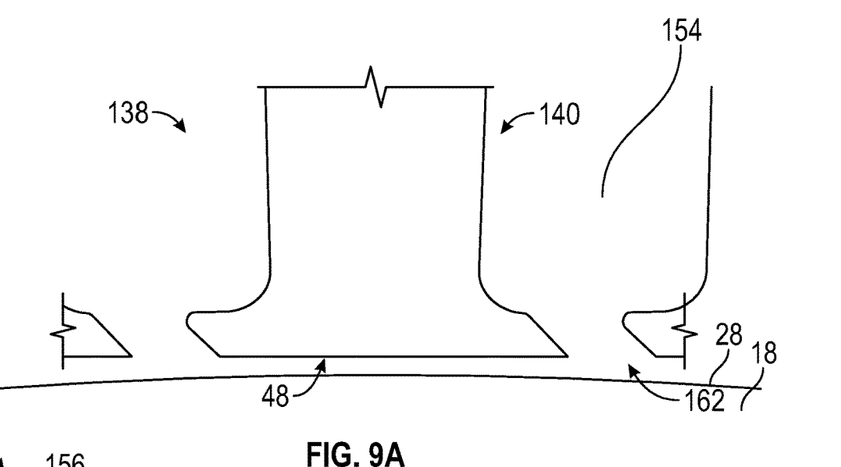
FIG. 9A is a partial plan view of a first plurality of stator teeth of a stator lamination, in accordance with a non-limiting example.
Figure 9B:
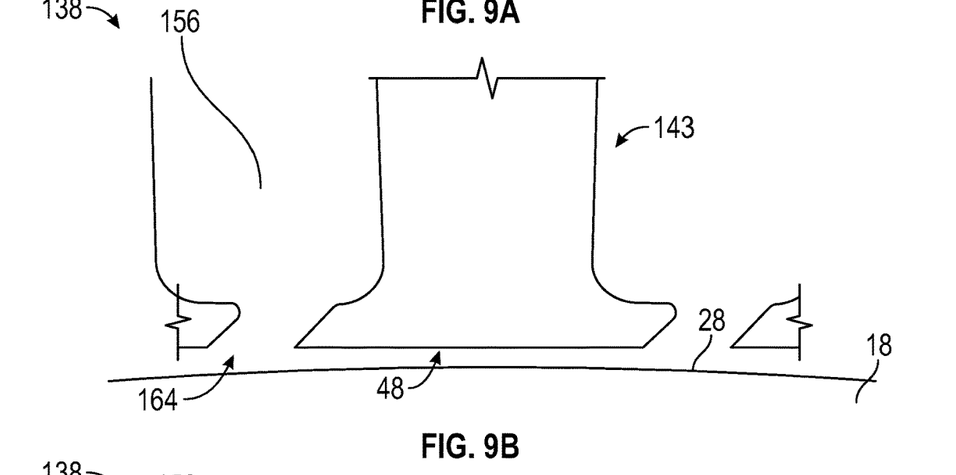
FIG. 9B is a partial plan view of a second plurality of stator teeth of the stator lamination of FIG. 5A, in accordance with a non-limiting example.
Figure 9C:
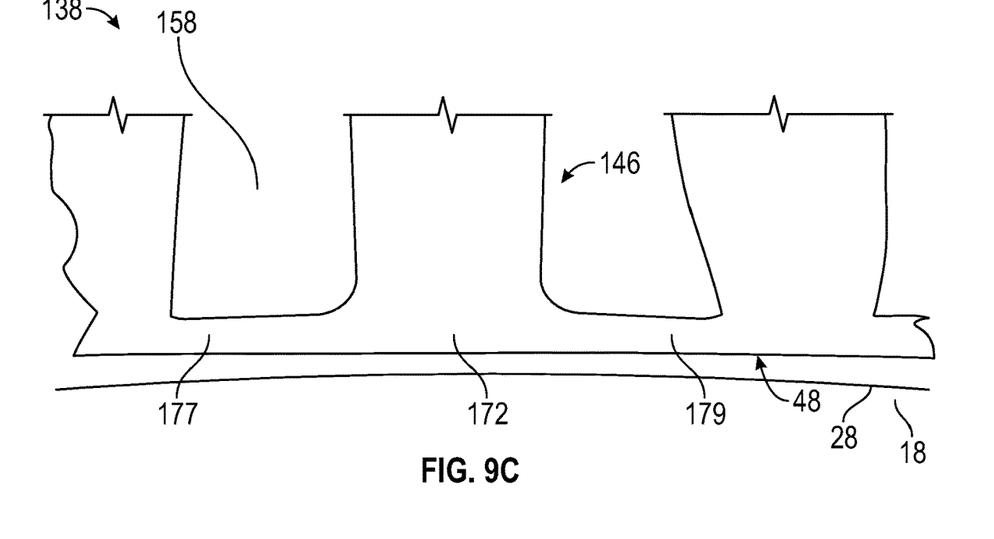
FIG. 9C is a partial plan view of a third plurality of stator teeth of the stator lamination of FIG. 5A, in accordance with a non-limiting example.

Reference will now follow to FIGS. 9A-9C and with continued reference to FIG. 1 in describing stator body 40 formed in accordance with another non-limiting example. In an embodiment, stator body 40 may be formed from a plurality of laminations 138 having a first plurality of radially extending stator teeth 140 and a second plurality of radially extending stator teeth 143, and a third plurality of radially extending stator teeth 146. First plurality of radially extending stator teeth 140 define a first plurality of gaps 154, second plurality of radially extending stator teeth 143 define a second plurality of gaps 156, and third plurality of radially extending stator teeth 146 define a third plurality of gaps 158.

In a non-limiting example, each of the first plurality of gaps 154 define a first opening 162 extending through inner annular surface 48 at a first angle having a first orientation, each of the second plurality of gaps 156 define a second opening 164 extending through inner annular surface 48 at a second angle having a second orientation that is distinct from the first orientation. Each of the third plurality of radially extending stator teeth 146 includes a tip portion 172 having a first bridge section 177 and an opposing second bridge section 179. First and second bridge sections 177, 179 eliminate any discontinuities in inner annular surface 48 at the third plurality of gaps 158. Thus, the plurality of laminations 138 define hybrid laminations that include differently oriented openings and bridges that create various barriers to magnetic flux which reduces stray capacitance, disrupts a flow path between stator 30 and rotor 18 and lowers parasitic voltages that may detract from overall efficiency of the electric machine 10.

Figure 10:
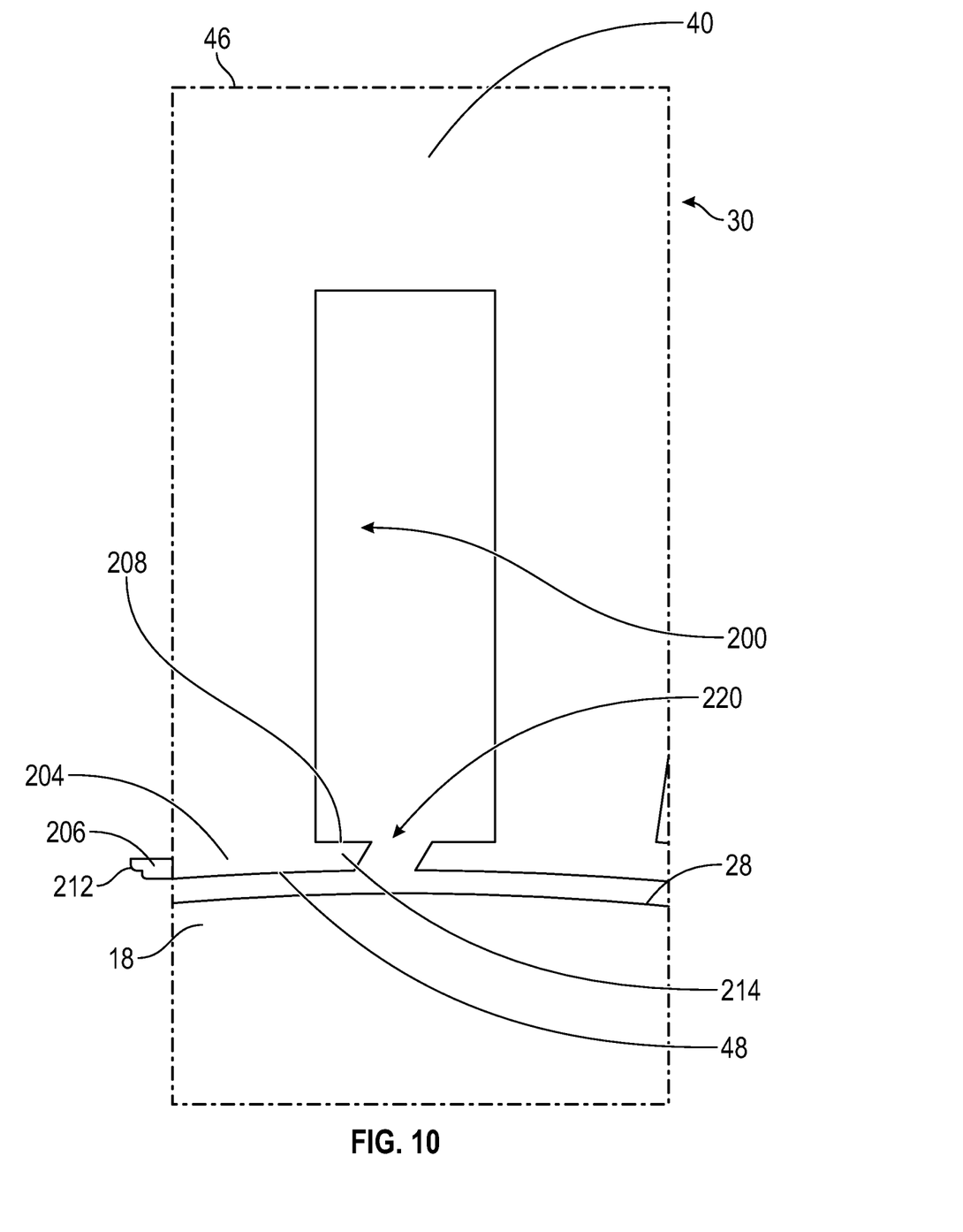
FIG. 10 is a plan view of a stator tooth, in accordance with another non-limiting example.

Reference will now follow to FIG. 10 with continued reference to FIG. 1 in describing a stator 40 including a plurality of stator teeth 200 in accordance with another non-limiting example. Each of the plurality of stator teeth 200 includes a tip portion 204 having a first side portion 206 and a second side portion 208. In a non-limiting example, second side portion 208 is spaced from a first side portion (not separately labeled) of an adjacent one of the plurality of stator teeth 200. First side portion 206 includes a first stepped profile 212 and second side portion 208 includes a second stepped profile 214. In a non-limiting example, second stepped profile 214 is spaced from a stepped profile (not separately labeled) on the adjacent one of the plurality of stator teeth 200 forming a staggered opening 220.

At this point, it should be understood that the various configuration of the tip portions in accordance with the non-limiting examples shown and described herein establish slot openings having a selected dimension that allows for readily installing a stator winding while, at the same time, disrupting a flow path of by parasitic voltages that may detract from overall efficiency of the electric machine 10.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric machine comprising:
   a housing;
   a rotor rotatably mounted to the housing; and
   a stator mounted to the housing about the rotor, the stator including a stator body formed from a plurality of laminations, the plurality of laminations including an outer annular surface defining a radius, an inner annular surface spaced from the rotor, and a plurality of radially inwardly extending stator teeth spaced one from another by plurality of gaps, each of the plurality of gaps extending along the radius and includes an opening exposed at the inner annular surface, the opening having a first side portion extending at a first angle relative to the radius and a second side portion extending at a second angle relative to the radius, the first angle and the second angle being substantially supplementary angles.

2. The electric machine according to claim 1, wherein each of the plurality of radially inwardly extending stator teeth includes a first end extending from the stator body and a tip portion that defines a portion of the inner annular surface.

3. The electric machine according to claim 2, wherein the tip portion of each of the plurality of radially inwardly extending stator teeth includes a first end portion defining the first side portion and a second end portion defining a second side portion of an adjacent opening.

4. The electric machine according to claim 1, wherein the first side portion includes the first angle and the second side portion of an adjacent one of the plurality of radially inwardly extending stator teeth includes the second angle that define the opening, the first angle and the second angle being one of an acute angle and an obtuse angle.

5. The electric machine according to claim 1, wherein the plurality of laminations includes a first plurality of laminations and a second plurality of laminations, wherein the first plurality of laminations includes a first side portion having the first angle and a second side portion having the second angle, and wherein the second plurality of laminations includes a first side portion having a third angle, and a second side portion having a fourth angle.

6. The electric machine according to claim 5, wherein the second plurality of laminations are positioned atop the first plurality of laminations.

7. The electric machine according to claim 6, wherein the first angle and the second angle combine to define a surface having a first end element, a second end element, and a recess disposed between the first end element and the second end element.

8. The electric machine according to claim 1, wherein the plurality of radially inwardly extending stator teeth include a first plurality of radially inwardly extending stator teeth spaced one from another by a first plurality of gaps, each of the first plurality of gaps including a first opening extending at the first angle and a second plurality of radially inwardly extending stator teeth spaced one from another by a second plurality of gaps including a second opening extending at the second angle that is distinct from the first angle.

9. The electric machine according to claim 8, wherein the plurality of radially inwardly extending stator teeth include a third plurality of radially inwardly extending stator teeth spaced one from another by a third plurality of gaps, each of the third plurality of gaps being devoid of an interruption in the inner annular surface.

10. The electric machine according to claim 9, wherein the each of the third plurality of radially inwardly extending stator teeth include a tip portion including a first bridge section and a second bridge section, the first bridge section and the second bridge section extending to an adjacent one of the plurality of radially inwardly extending stator teeth across the third plurality of gaps.

11. A stator for an electric machine comprising:
a stator body formed from a plurality of laminations, the plurality of laminations including an outer annular surface defining a radius, an inner annular surface;
a plurality of radially inwardly extending stator teeth spaced one from another by plurality of gaps, each of the plurality of gaps extending along the radius and includes an opening exposed at the inner annular surface, wherein the opening includes a first side portion extending at a first angle relative to the radius and a second side portion extending at a second angle relative to the radius, the first angle and the second angle being substantially supplementary angles.

12. The stator according to claim 11, wherein each of the plurality of radially inwardly extending stator teeth includes a first end extending from the stator body and a tip portion that defines a portion of the inner annular surface.

13. The stator according to claim 12, wherein the tip portion of each of the plurality of radially inwardly extending stator teeth includes a first end portion defining the first side portion and a second end portion defining a second side portion of an adjacent opening.

14. The stator according to claim 11, wherein the plurality of laminations includes a first plurality of laminations and a second plurality of laminations, wherein the first plurality of laminations includes a first side portion having the first angle and a second side portion having the second angle, and wherein the second plurality of laminations includes a first side portion having a third angle, and a second side portion having a fourth angle.

15. The stator according to claim 14, wherein the second plurality of laminations are positioned atop the first plurality of laminations.

16. The stator according to claim 15, wherein the first angle and the second angle combine to define a surface having a first end element, a second end element, and a recess disposed between the first end element and the second end element.

17. The stator according to claim 11, wherein the plurality of radially inwardly extending stator teeth include a first plurality of radially inwardly extending stator teeth spaced one from another by a first plurality of gaps, each of the first plurality of gaps including a first opening extending at the first angle and a second plurality of radially inwardly extending stator teeth spaced one from another by a second plurality of gaps including a second opening extending at the second angle that is distinct from the first angle.

18. The stator according to claim 17, wherein the plurality of radially inwardly extending stator teeth include a third plurality of radially inwardly extending stator teeth spaced one from another by a third plurality of gaps, each of the third plurality of gaps being devoid of an interruption in the inner annular surface.

19. The stator according to claim 18, wherein each of the third plurality of radially inwardly extending stator teeth include a tip portion including a first bridge section and a second bridge section, the first bridge section and the second bridge section extending to an adjacent one of the plurality of radially inwardly extending stator teeth across the third plurality of gaps.

* * * * *